United States Patent [19]

Hickok

[11] Patent Number: 4,785,359
[45] Date of Patent: Nov. 15, 1988

[54] DUAL PURPOSE MEMORY FOR TIME DIVISION MULTIPLEXING AND TIME BASE ERROR CORRECTION

[75] Inventor: William K. Hickok, Rochester, N.Y.

[73] Assignee: Eastman Kodak Company, Rochester, N.Y.

[21] Appl. No.: 915,489

[22] Filed: Oct. 6, 1986

[51] Int. Cl.$^4$ .................. H04N 5/95; H04N 5/92
[52] U.S. Cl. ........................ 360/9.1; 360/36.1; 360/36.2; 360/23; 358/337; 358/339
[58] Field of Search ............ 360/9.1, 36.1, 36.2, 360/35.1, 23; 358/337, 339, 335, 320

[56] References Cited

U.S. PATENT DOCUMENTS

| Re. 29,999 | 5/1979 | Hirota | 360/107 |
|---|---|---|---|
| 3,781,463 | 12/1973 | Van den Bussche | 358/310 |
| 4,063,284 | 12/1972 | Tatami | 338/339 |
| 4,064,540 | 12/1977 | Jetten | 358/183 |
| 4,084,181 | 4/1978 | Mita | 358/323 |
| 4,099,204 | 7/1978 | Lowe | 360/36.1 |
| 4,127,865 | 11/1978 | Poetsch | 358/12 |
| 4,133,009 | 1/1979 | Hittler | 360/9.1 |
| 4,163,247 | 7/1979 | Bock | 358/12 |
| 4,163,248 | 7/1979 | Heitmann | 358/12 |
| 4,183,067 | 1/1980 | Kihara | 360/75 |
| 4,210,927 | 7/1980 | Yumde | 358/12 |
| 4,215,376 | 7/1980 | Mach | 360/36.2 |
| 4,277,796 | 7/1981 | Ross | 358/342 |
| 4,283,744 | 8/1981 | Melwisch | 360/36.1 |
| 4,297,728 | 10/1981 | Lowe | 360/36.1 |
| 4,300,161 | 11/1981 | Haskell | 358/142 |
| 4,335,393 | 6/1982 | Pearson | 358/12 |
| 4,376,957 | 3/1983 | Dischert | 358/310 |
| 4,577,236 | 3/1986 | Tokaroshi | 358/320 |
| 4,597,019 | 6/1986 | Nishimoto | 360/23 |
| 4,695,900 | 9/1987 | Honjo | 358/310 |
| 4,730,222 | 3/1988 | Schauffele | 358/310 |
| 4,750,054 | 6/1988 | Hickok | 358/337 |

OTHER PUBLICATIONS

6/14/82, Letter from Bosch, Japan and Report, "Timeplex-A Color Coding System for Home Video Recorders".
IEEE Transactions on Comm.; Com-22, No. 12, (Dec. 1974), pp. 1932-1939.
Time-Compression Multiplexer Transmission; by Flood, pp. 647-648.

Primary Examiner—Alan Faber
Attorney, Agent, or Firm—Robert M. Wallace

[57] ABSTRACT

In a time division multiplex video reproducing apparatus, a dual purpose memory serves to (a) perform time compression for time division multiplexing and (b) perform as a variable delay line for time base error correction. Seemingly unavoidable conflicts in the allocation of memory space (between multiplexing operations and time base error correction operations) are eliminated by performing the time base error correction operations during a memory idle time inherent in the time division multiplexing process. As a result, time base error correction in this invention requires little additional hardware and no additional space in the memory beyond that required for time division multiplexing.

4 Claims, 8 Drawing Sheets

FIG. 1

FIG. 2a (PLAYBACK)

FIG. 2b (RECORD)

DUAL PURPOSE MEMORY FOR TIME DIVISION MULTIPLEXING AND TIME BASE ERROR CORRECTION

BACKGROUND OF THE INVENTION

1. Field of the Invention

The invention is related to video tape recorder and playback systems employing time division multiplexing and requiring time base error correction.

2. Description of the Related Art

Video tape recorder and playback systems using time division multiplexing are well known in the art, one exemplary description being given in a patent application Ser. No. 725,873 entitled "VIDEO REPRODUCING APPARATUS" filed by Carl Nelson Schauffele on Apr. 22, 1985. Another description is given in U.S. Pat. No. 4,300,161. Time division demultiplexing typically requires a switch to divide the video signal into time segments, and a memory to time-decompress each of the segments.

PROBLEM

A significant problem with video tape recorders such as video cassette recorders (VCR's) involves time base errors. This problem is particularly acute in VCR's using time division multiplexing (TDM). Specifically, the required accuracy for time base error correction is increased in approximate proportion of the time compression of the TDM format.

Various techniques are known for effecting time base error correction, such as those exemplified in U.S. Pat. Nos. 4,099,204, 4,283,744 and 4,297,728. These time base error correction techniques require additional hardware such as delay lines and are not specifically adapted to TDM VCR's.

U.S. Pat. No. 4,084,181 to Mita et al. discloses a TDM VCR in which timing errors are corrected by varying, in a phase lock loop, the clock signal frequency thereof using a voltage controlled oscillator (VCO). However, the range of correctable error in this technique is limited by the maximum phase difference which the phase lock loop is capable of handling.

In summary, prior time base error correction techniques are of only limited value in TDM VCR's. It appears that a complete time base error correction system useful in TDM VCR's and having the capacity to correct a large range of errors would require additional circuitry and would therefore increase the manufacturing cost, a significant disadvantage. Therefore, there is a great need for a time base error correction system for use in TDM VCR's which is accurate, has a large error correction capacity and does not require a significant amount of additional circuitry.

SUMMARY OF THE INVENTION

Solution To The Problem

In this invention, the TDM memory ordinarily required to perform time compression for time division multiplexing is used for a dual purpose, namely to perform time compression for multiplexing and to act as a variable delay line under the control of a time base error correction control loop. Thus, time base error correction (time delay) and TDM multiplexing (time compression) are accomplished together in this invention without requiring additional memories or delay lines, a significant advantage.

One problem encountered in implementing this solution is that, in a typical well-designed TDM VCR, nearly all of the memory is used in the time division multiplexing process. Thus, unless more memory is added, the multiplexing and time delay operations cannot have their own separate allocations of memory space and therefore would apparently conflict. This seemingly unavoidable conflict is eliminated by performing the time delay function only during a recurring interval of time in the multiplexing process in which the memory is essentially idle. (This idle time is attributable to the time compression function performed by the memory.) As a result, the variable delay line function for time base error correction requires no separate or additional space in the memory beyond that already allocated to the time compression function for multiplexing.

Specifically in TDM memory demultiplex/time decompression operations, there is an idle time window following the completion of the writing-in of the various serial time-compressed segments (e.g., the luminance and chrominance segments) of each horizontal line of video data. Readout from memory of the plurality of video segments comprising one horizontal line must commence sometime within the idle time window. The duration of the idle time window is a function of the difference between the time required to serially write in all time compressed video segments of each horizontal line and the time allotted to read them out in parallel. (It is also a function of the manner in which the memory is partitioned, as will be described later herein.)

In this invention, a time base error correction control loop varies the time delay between the completion of each memory write operation and commencement of the next memory read operation (the "write-read time delay") strictly within the idle time window. For example, during playback of a video signal previously recorded in TDM format, the time of commencement of each memory read operation is varied within the idle time window by a comparator which compares a reference horizontal sync pulse with the playback video signal horizontal sync pulse. If the comparator senses a time difference between the two sync pulses, it changes the write-read time delay in subsequent horizontal video lines.

A principal advantage of the invention is that the dual use of the memory for both TDM time compression and as a variable delay line not only results in hardware savings and design simplicity but also provides a large capacity for time base error correction proportional to the duration of the idle time window of the memory.

While it will be appreciated that various well-known devices may be employed to vary the memory write-read time delay in accordance with the invention, a digital control loop is preferred because it is readily adapted to operate within a range that takes full advantage of the entire memory idle time window, thereby guaranteeing the maximum possible error correction capacity. In the preferred digital control loop, the write and read timing in the memory is locked to the frequency of the incoming horizontal sync pulse, but the read timing (only) is phase shifted with respect to the incoming horizontal sync pulse whenever necessary to maintain the read timing constant with respect to absolute time. However, this phase shift never exceeds the memory idle time window. The start time of the reading out of memory of each horizontal video line is controlled by a divide counter stimulated by each incoming horizontal sync pulse to count pulses from an oscillator. The modulus of the divide counter is set by an up/down counter having its output connected to the input of the divide counter. The sync pulse comparator causes the up/down counter to increment or decrement the divide counter modulus by one count each time the comparator senses that an incoming horizontal sync pulse is either early or late, respectively. The capacity of the up/down counter is selected to just accommodate the maximum possible change in the write-read time delay within the memory idle time window.

DESCRIPTION OF THE DRAWINGS

The invention may best be understood by reference to the accompanying drawings, of which.

DETAILED DESCRIPTION

Prior Art

1. TDM Recording

Each horizontal video line of an incoming composite video signal is separated into its three video components Y, I and Q. The Y, I and Q components are digitally sampled at frequencies $f_1$, $f_2$ and $f_3$, respectively, and separately stored in Y, I and Q memories, respectively. The Y, I and Q components are then read out of memory during three respective time division multiplexing intervals at a frequency $f_4$, converted to analog, FM modulated and recorded on a video tape.

2. TDM Playback

The playback process is the reverse of the recording process. The Y, I and Q video components of each horizontal video line played back from the video tape are FM demodulated and digitally sampled at the frequency $f_4$ during their respective time division intervals. They are then loaded into the Y, I and Q memories, respectively. Next, the Y, I and Q components are simultaneously unloaded from memory at the frequencies $f_1$, $f_2$, and $f_3$, respectively, converted to analog and combined to form a composite video signal.

CONCEPT OF THE INVENTION

Figure 1:
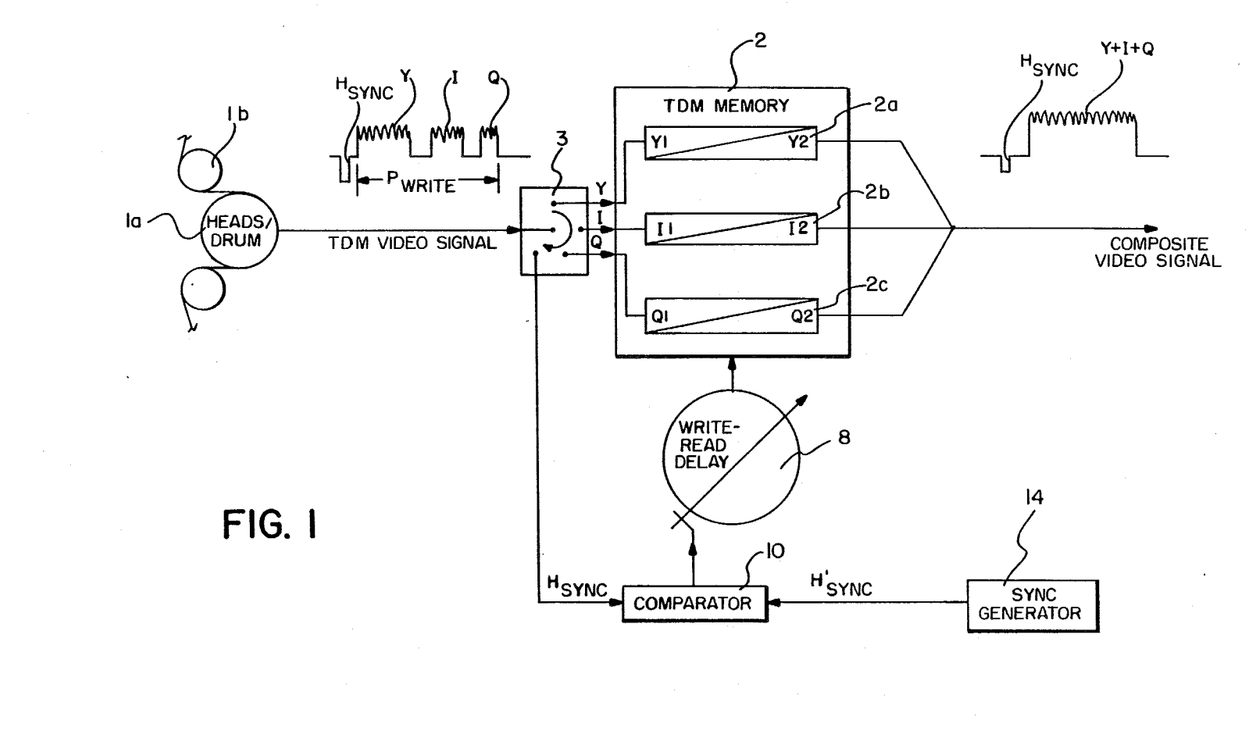
FIG. 1 is a simplified block diagram illustrating the basic concept of the invention.

Referring to FIG. 1, a TDM VCR system configured in playback mode includes a video tape 1a, a head and drum assembly 1b and TDM memory 2. One horizontal line of a TDM video signal played back from the tape 1a includes three time-compressed color components Y, I and Q and the usual synchronization pulses. These components are separated by a demultiplexing switch 3 and written (loaded) sequentially into respective Y, I and Q memories 2a, 2b, 2c within the memory 2. They are then simultaneously read out (unloaded) from the memory 2 to generate one horizontal line of a composite video signal in the well-known manner. Alternatively, the demultiplexed Y, I and Q components are not combined into a composite video signal but are transmitted separately in parallel.

Ordinarily, adding a time base error correction function with a large error correction capacity to such a system would entail adding hardware including variable delay lines capable of storing about one horizontal line of video data for each of the video components Y, I and Q. The present invention adds a time base error correction function having a large error correction capacity without adding delay lines to the system. Instead, the variable delay line function required for time base error correction is incorporated into the already existing TDM memory 2 without requiring additional memory space and without conflicts between the TDM function (already performed by the TDM memory 2 as just described) and the variable delay line function, a remarkable result.

The manner in which this result is obtained by the invention is best understood by first considering an often-overlooked feature of the typical TDM playback system: Referring to FIG. 1, there is an idle time window of limited duration following the completion of the serial writing (loading) into the memory 2 of the three components Y, I and Q, of each horizontal line of the TDM video signal. Commencement of the simultaneous reading (unloading) out of the memory 2 of these Y, I and Q components must occur sometime within the idle time window in order to avoid conflicting with the writing in of the next horizontal line of video data. Otherwise, such a conflict would disrupt the video signal. The duration of the idle time window is constant and is a function of the time period $p_{write}$ (see FIG. 1) required to write into the memory 2 the serial Y, I and Q components of each horizontal video line, and the time period $p_{read}$ (see FIG. 1) allotted to read them out of the memory 2.

Assuming that each of the Y, I and Q memories 2a, 2b, 2c is divided into two sub-memories Y1, Y2; I1, I2; Q1, Q2, as shown in FIG. 1, which alternate every horizontal line between the reading out of one horizontal line of video data and the writing in of the next horizontal line of video data, the duration D of the memory idle time window is just equal to $p_{write} - p_{read}$. The commencement of each memory read operation must occur sometime within the idle time window duration $D = p_{write} - p_{read}$ following the completion of the previous memory write operation. The duration of the idle time window may be further expanded by dividing each of the Y, I and Q memories into three (or more) sub-memories, and this will be discussed later herein in greater detail. The write-read time delay between the completion of a memory write operation and the commencement of the next memory read operation may be therefore no greater than the duration D of the memory idle time window and may be virtually as small as zero.

In this invention, the write-read delay is varied (strictly within the limits of the memory idle time window) by a write-read delay controller 8 in such a manner as to compensate for time base errors. The controller 8 responds to a comparison -- made by a sync comparator 10 -- between the incoming horizontal sync pulse $H_{sync}$ received from the switch 3 and a reference (local) horizontal sync pulse $H'_{sync}$ furnished by a highly stable reference sync pulse generator 14, which may include a crystal controlled oscillator. The local horizontal sync pulse H'$_{sync}$ may be generated by the generator 14 in accordance with the invention disclosed in U.S. patent application Ser. No. 915,487, filed Oct. 6, 1986, entitled "Noise-Impervious Video Timing Recovery and Automatic Skew Compensation", by William K. Hickok. In the absence of any time base errors in the incoming H$_{sync}$ pulse, the reference H'$_{sync}$ pulse and the incoming H$_{sync}$ pulse have the same frequency and phase. They are of different phases whenever a time base error occurs.

In case of a variation in the timing of the incoming H$_{sync}$ pulse, the write-read delay is changed so as to compensate for the variation. The variation in the write-read time delay thus provided has the effect of a variable time delay. A principal advantage of the invention illustrated in FIG. 1 is that the variable delay line function performed by the TDM memory 2 under the control of the comparator 10 requires no other space in the memory 2 besides the memory space already allocated to store each horizontal line of video data for the time-decompression/demultiplexing operation. Instead of realizing the variable delay line function as additional memory space in the TDM memory 2, the delay line function is realized instead as a shift in time of the memory write-read delay (but strictly within the memory idle time window during which such a shift will not interfere with the demultiplexing operation). Thus, the invention avoids any conflicts in memory use without requiring additional memory space.

PLAYBACK SYSTEM DESIGN

Figure 2A:
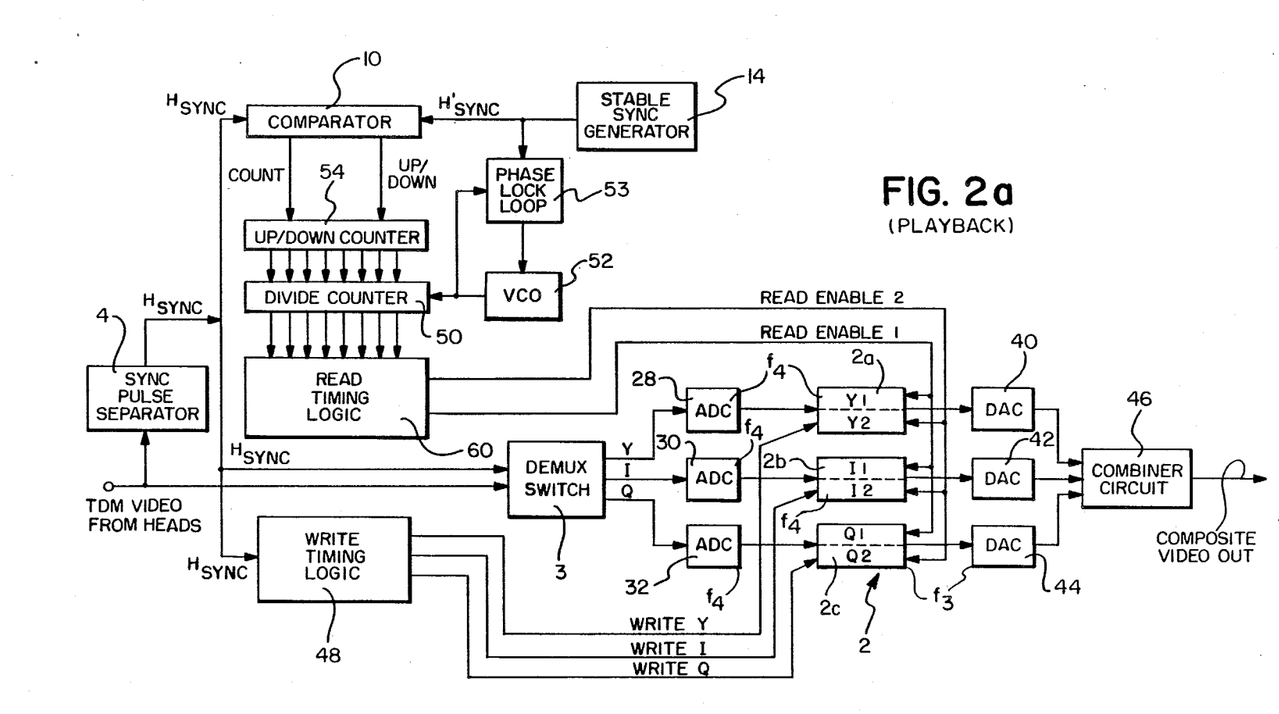
FIGS. 2a and b are simplified block diagrams illustrating TDM playback and record systems, respectively, embodying the invention.

FIG. 2a is a block diagram illustrating the TDM playback system of the invention. It includes the switch 3, and Y, I and Q analog-to-digital converters 28, 30, 32, each having its input connected to the Y, I and Q outputs, respectively, of the switch 3. The switch 3 operates in synchronism with the H$_{sync}$ pulse of the playback TDM video signal derived through a sync pulse separator 4. The outputs of the analog-to-digital converters 28, 30 and 32 are applied to the write inputs of the Y, I and Q memories 2a, 2b, 2c, respectively, whose read outputs are applied to the inputs of Y, I and Q digital-to-analog converters 40, 42, 44, respectively. The outputs of the digital-to-analog converters 40, 42, 44 are combined in a circuit 46. While the term "memory" is applied herein to the three devices 2a, 2b, 2c of FIG. 2, they may be three serial shift registers or three random access memories or any other equivalent form.

The write inputs of the Y, I and Q memories 2a, 2b, 2c operate at the data sampling frequency f$_4$. For this purpose, write timing logic 48 transmits to the Y, I and Q memories write enable signals WRITE-Y, WRITE-I, WRITE-Q in synchronism with the incoming H$_{sync}$ pulse during the individual TDM intervals of the Y, I and Q components, respectively.

The read-out from memory of data corresponding to even and odd numbered horizontal video lines is controlled by READ ENABLE 1 and READ ENABLE 2 logic signals, respectively, applied to respective portions of each of the memories 2a, 2b, 2c. For example, the READ ENABLE 1 and 2 signals are applied to the Y1 and Y2 memories, respectively. The Y, I and Q video data previously written into memory is simultaneously read out at the three different frequencies f, f$_2$ and f$_3$, respectively.

TIME BASE ERROR CORRECTION

A time base error correction digital control system controlling the READ ENABLE logic signals will now be described. The incoming H$_{sync}$ pulse is applied to a "start count" input of a divide counter 50. The divide counter 50 begins counting pulses, from a voltage controlled oscillator (VCO) 52, by a modulus M with the occurrence of each incoming H$_{sync}$ pulse. Read timing logic 60 produces one of the READ ENABLE signals each time the divide counter 50 reaches its maximum count, $2^N - 1$. The VCO 52 is phase-locked with the pulse generator 14 through a phase lock loop 53 in the well-known manner.

The divide counter modulus M is determined by the output of an N-bit up/down counter 54 whose count and up/down control inputs 54a, 54b, respectively, are controlled by the sync pulse comparator 10. The sync pulse comparator 10 receives the incoming H'$_{sync}$ pulse through the switch 3 and receives the reference horizontal sync pulse H'$_{sync}$ from the reference pulse generator 14. Each time the comparator 10 determines that the previous incoming H$_{sync}$ pulse is either early or late with respect to the reference H'$_{sync}$ pulse, it transmits a count pulse to the count input 54a of the up/down counter 54 and transmits a high (late) or a low (early) up/down signal, respectively, to the up/down input 54b of the up/down counter 54.

Prior to operation, the up/down counter 54 is initialized with an N-bit word corresponding to the modulus M of the divide counter 50. Whenever the sync comparator 10 senses a late incoming H$_{sync}$ pulse, for example, the up/down counter 54 counts up by one so that the modulus of the divide counter 50 decreases by one. This incrementally advances the occurrence of the next READ ENABLE pulse (by one VCO count) with respect to the timing of the incoming H$_{sync}$ pulse, and therefore decreases the delay between the end of the present write operation and the beginning of the next read operation in each memory 2a, 2b, 2c.

The digital control system just described is just one of a number of ways that the variable read-write time delay 8 of FIG. 1 could be implemented in accordance with the present invention. However, the digital control system described here is readily endowed with a capacity for tracking large time base errors precisely within the memory idle time window. The capacity to track time base errors may be increased by increasing the number N of bits of the two counters 50, 54 or by decreasing the frequency of the VCO 52 and the initial modulus M of the divide counter 50, or any combination of the foregoing. The number N of bits of the counters 50, 54 and the period T of the VCO 52 are preferably chosen so that the maximum shift, $(2^N-1)T$, in the write-read time delay just equals the duration D of the memory idle time window. Thus, the system will correct an ever-increasing time base error, for example, until the error exceeds D, after which no further corrections will be made. The maximum error correction capacity therefore lies just within the strict confines of the memory idle time window, avoiding any conflict between memory write and read operations.

One of skill in the art may readily implement the sync pulse comparator 10 of FIG. 2. One example is illustrated in FIG. 3. The comparator 10 receives the H$_{sync}$ and H'$_{sync}$ pulses at its inputs 10a, 10b and generates the "count" and "up/down" signals at its outputs 10c, 10d, respectively. Each "Delay $\tau$" depicted in FIG. 3 is less than half the H'$_{sync}$ pulse width. The pulse width of both One Shot #1 and One Shot #2 is $(\frac{1}{2})D-\tau$. The delay of One Shot #2 is the period of the H'$_{sync}$ pulse minus twice the pulse width of One Shot #1. This arrangement helps prevent the comparator 10 from exceeding the range of the counters 50, 54. The three delays (labeled "Delay $\tau$" in FIG. 3) serve to limit the duty cycle of the up/down counter 54.

MULTIPLEX MEMORY PARTITIONING

A technique for avoiding conflicts between simultaneous memory write and read operations is to partition or divide each memory 2a, 2b, 2c into two sub-memories and to alternate simultaneous read and write operations between the sub-memories, as mentioned previously. As illustrated in FIG. 1, each Y, I and Q memory 2a, 2b, 2c is partitioned or divided into two sub-memories Y1, Y2; I1, I2; Q1, Q2, each sub-memory storing one complete line of video information and each sub-memory pair being operated together in complementary fashion. As previously described in reference to FIG. 1, the memory idle time window duration D of this arrangement is no greater than $p_{write}-p_{read}$.

Figure 4:
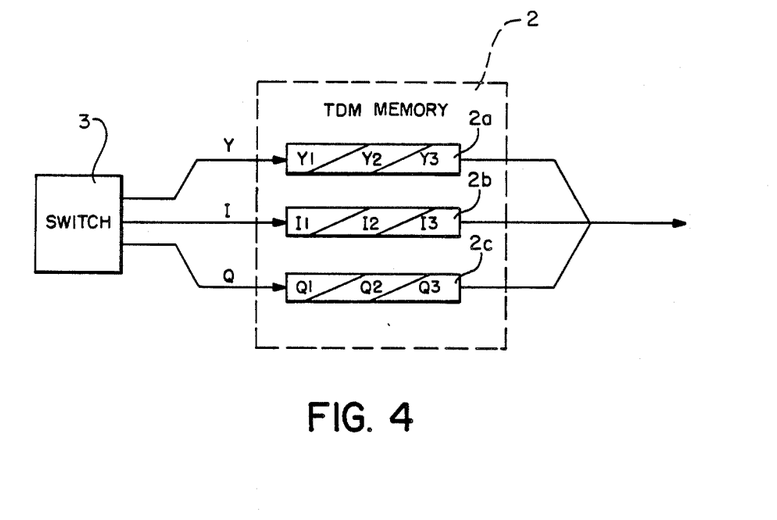
FIG. 4 is a simplified block diagram of a three-way partitioned TDM memory useful in the system of FIG. 2.

The memory idle time window duration D, within which the READ ENABLE logic signals are shifted in this invention, may be increased by dividing each of the memories 2a, 2b, 2c into three sub-memories (or more) instead of two. This advantageously increases the maximum time base error that the system is capable of correcting. FIG. 4 illustrates the division of each of the Y, I and Q memories 2a, 2b, 2c into three sub-memories Y1, Y2, Y3; I1, I2, I3; Q1, Q2, Q3, respectively. In the Y memory 2a, for example, writing one line of video data into the Y1 sub-memory is accompanied by reading the previous line of data from the Y2 sub-memory while the Y3 sub-memory is idle for a time period $p_{write}$. (It will be recalled $p_{write}$ is the time required to write one line of video data into memory.) Subsequently, reading out data from the Y2 sub-memory is accompanied by writing in data to the Y3 sub-memory while the Y1 sub-memory is idle for a time period $p_{write}$. Reading and writing in the I and Q memories 2b, 2c occurs in the same manner as in the Y memory 2a. Thus, by partitioning each memory 2a, 2b, 2c into three sub-memories instead of two, the memory idle time window duration is increased by the time period $p_{write}$. In the embodiment of FIG. 4, the READ ENABLE logic signals may be shifted in time over a much larger window to correct much larger time base errors. Accordingly, the error correction capacity of the time base error correction system of FIG. 2 may be increased by adding to the capacity of the Y, I and Q TDM memories 2a, 2b, 2c.

PLAYBACK SYSTEM OPERATION

Figure 5:
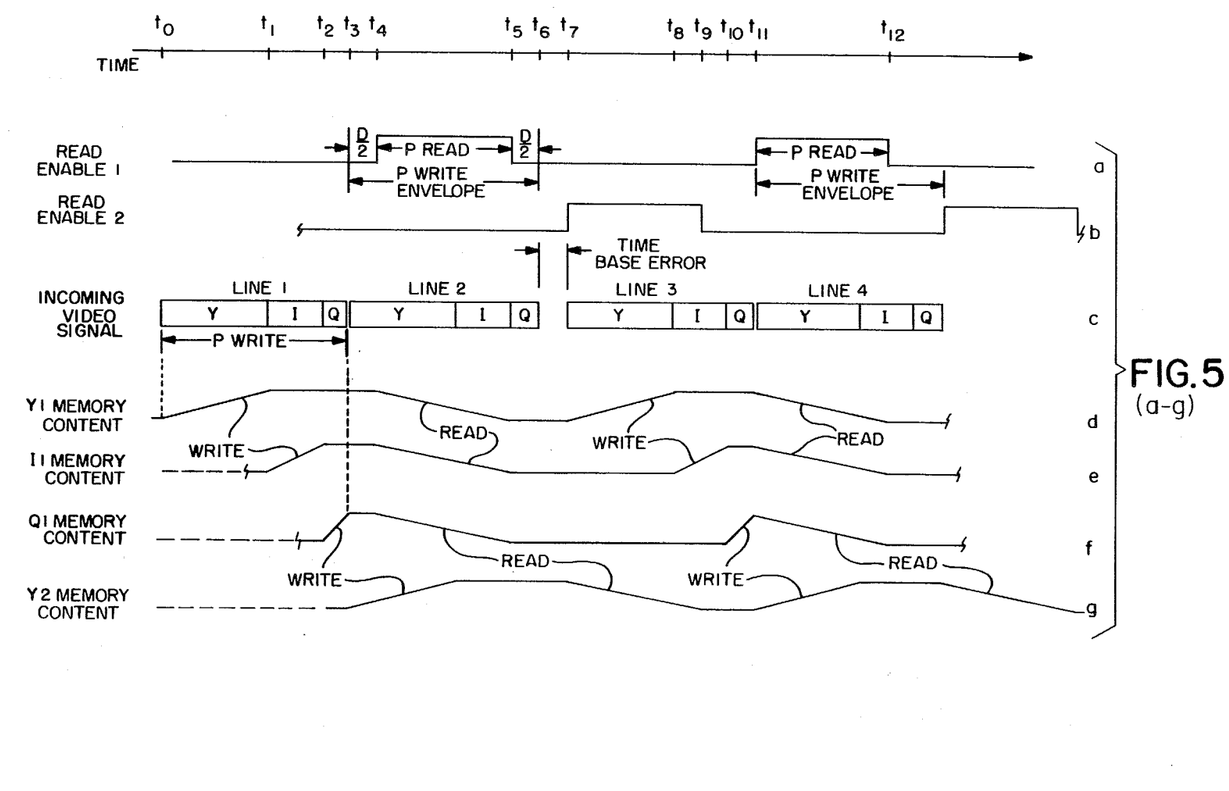
FIG. 5 includes contemporaneous timing diagrams illustrating the operation of the system of FIG. 2 in playback mode.

Playback operation of the system of FIG. 2 will now be described with reference to FIG. 5. In the example of FIG. 5, it is assumed each of the memories 2a, 2b, 2c of FIG. 2 is partitioned into sub-memory pairs, as illustrated in FIG. 1.

WRITE TIMING

In FIGS. 5d–i, alternate horizontal video lines of the serial succession of Y, I and Q components of the incoming TDM video signal of FIG. 5c are written (loaded) into alternate ones of the Y1, I1, Q1 sub-memories and the Y2, I2, Q2 sub-memories, respectively, in order of occurrence. Thus, the Y component of video line 1 is written into the Y1 sub-memory between times $t_0$ and $t_1$ (FIG. 5d), the line 1 I component is written into the I1 sub-memory between times $t_1$ and $t_2$ (FIG. 5e) and the line 1 Q component is written into the Q1 sub-memory between times $t_2$ and $t_3$ (FIG. 5f). Each of the three components, Y, I, Q, of the second line of the incoming TDM video signal of FIG. 5c are written in a similar manner into the Y2, I2 and Q2 sub-memories, respectively, between times $t_3$ and $t_6$ as illustrated in FIGS. 5g, h and i. Thus, the Y1, I1, Q1 sub-memories are ready for simultaneous read-out of their contents at time $t_3$ while the Y2, I2, Q2 sub-memories are ready at time $t_6$.

READ TIMING

Reading (unloading of data from the Y1, I1 and Q1 sub-memories occurs simultaneously in synchronism with the READ ENABLE 1 logic signal of FIG. 5a. Reading from the Y2, I2 and Q2 sub-memories occurs simultaneously in synchronism with the READ ENABLE 2 logic signal of FIG. 5b.

The first line (and each subsequent odd number line) of the demultiplexed video signal of FIG. 5j is read out from the Y1, I1, Q1 sub-memories. Reading of the first line occurs from time $t_4$ to time $t_5$, as illustrated in FIGS. 5d, e and f. The second line (and each subsequent even number line) of the demultiplexed video signal of FIG. 5j is read out from the Y2, I2, Q2 sub-memories. Reading of the second line occurs from time $t_7$ to time $t_9$, as illustrated in FIGS. 5g, h and i. Reading of the first video line occupies a time interval $p_{read}$ between times $t_4$ and $t_5$ and must lie within a restrictive envelope of duration $p_{write}$ starting at time $t_3$ and ending at time $t_6$ (which is after the Y1, I1 and Q1 sub-memories are fully loaded and before receipt of the next odd number video line to be written). Otherwise, conflicts may arise between the writing and successive reading of the same line of video data in memory or between the simultaneous writing and reading of two successive lines of data in memory. A similar restriction applies to reading from the Y2, I2 and Q2 sub-memories.

Initially, in the absence of any time base errors, each read period $p_{read}$ (e.g., from time $t_4$ to time $t_5$) is arranged symmetrically with respect to the corresponding restrictive envelope $p_{write}$ to accommodate the maximum shift of the read period $p_{read}$ in either direction within the restrictive envelope. In order to remain within the restrictive envelope $p_{write}$, the read period time-shift must not exceed $D/2=(p_{write}-p_{read})/2$ in either direction.

OPERATION OF THE TIME BASE ERROR CORRECTION CONTROL LOOP

Referring to FIG. 5c, a time base error occurs at time $t_7$ because incoming video line 3, which should have arrived earlier, is late. Therefore, at time $t_7$, the comparator 10 detects a late incoming H$_{sync}$ pulse and transmits a count pulse and a high up/down signal to the count and up/down inputs 54a, b, respectively, of the up/down counter 54. This decrements by one the modulus M of the divide counter 52. As a result, the next READ ENABLE 1 pulse occurring at time $t_{11}$ is advanced with respect to the incoming H$_{sync}$ pulse timing by one VCO count. The next READ ENABLE 2 pulse is similarly advanced.

The result is that the timing of the output demultiplexed video signal of FIG. 5j is unaffected by the time base error which occurred in the incoming multiplexed video signal of FIG. 5c at time $t_7$.

In this very simple example, an advance by one VCO count in the READ ENABLE pulse timing, with respect to the $H_{sync}$ pulse timing, shifted the read period by the maximum allowable amount—to the beginning edge of the restrictive envelope. Therefore, the maximum swing in the up/down counter 54 would be just a few VCO counts, and the idle time window D would correspond to only about two VCO counts. In the preferred embodiment, however, the idle time window D would correspond to 256 VCO counts, the counter 50 would have eight bits, and the correction of a single time base error may occur over the course of several horizontal video lines.

The digital control loop comprising the comparator 10, the counters 50, 54 and the VCO 52 maintains the timing of the READ ENABLE pulses of FIGS. 5a and b constant with respect to absolute time—but not necessarily with respect to the incoming $H_{sync}$ pulse timing—as long as the time base error does not exceed one-half the memory idle time window duration D in either direction of time. Thus, the digital loop prevents the system from exceeding the limits of the idle time window duration D. At the same time, the digital loop locks the frequency of the READ ENABLE signals of FIGS. 5a and b to the frequency of the incoming $H_{sync}$ pulse.

RECORD SYSTEM

Figure 2B:
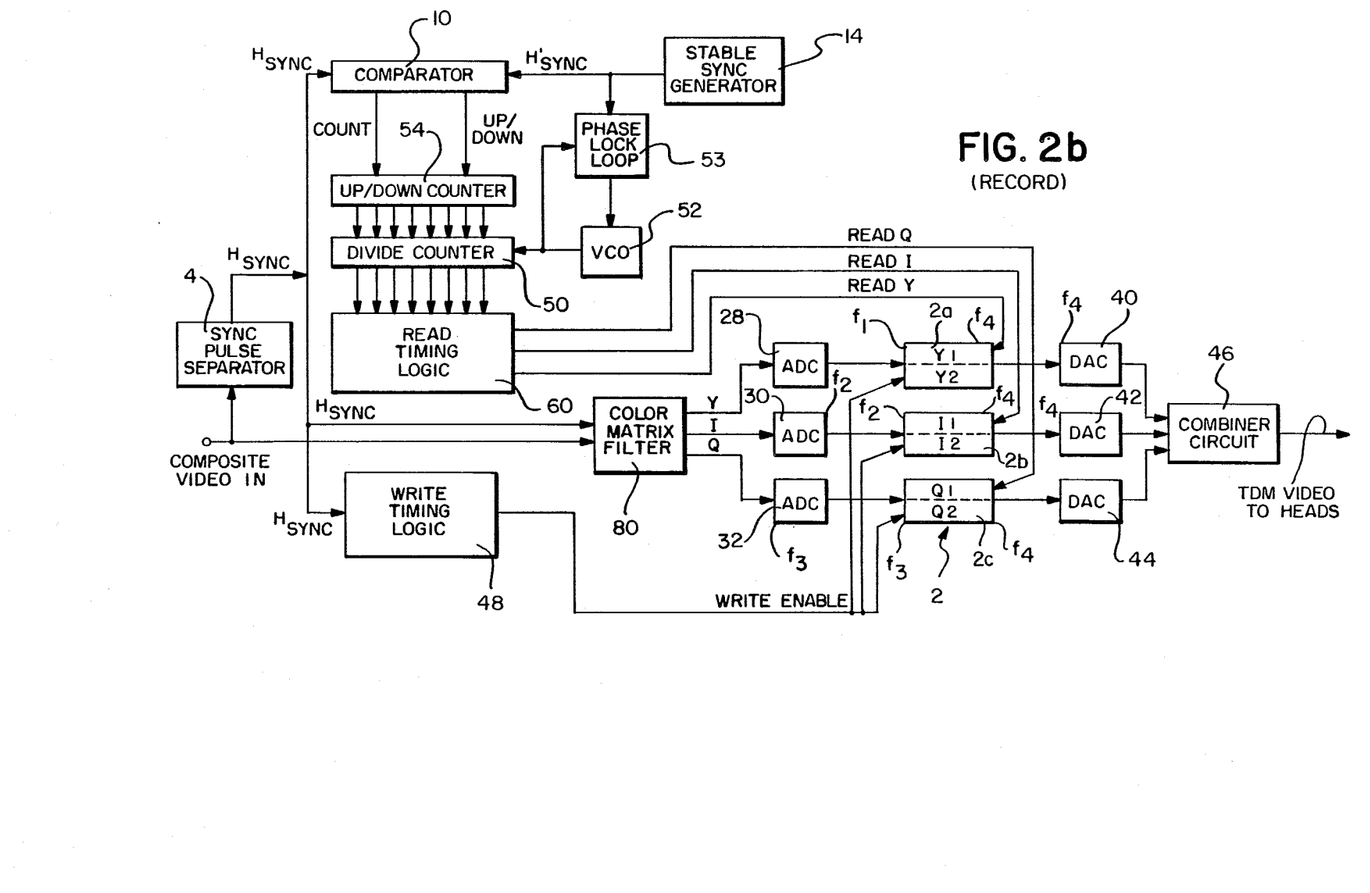
Figure 3:
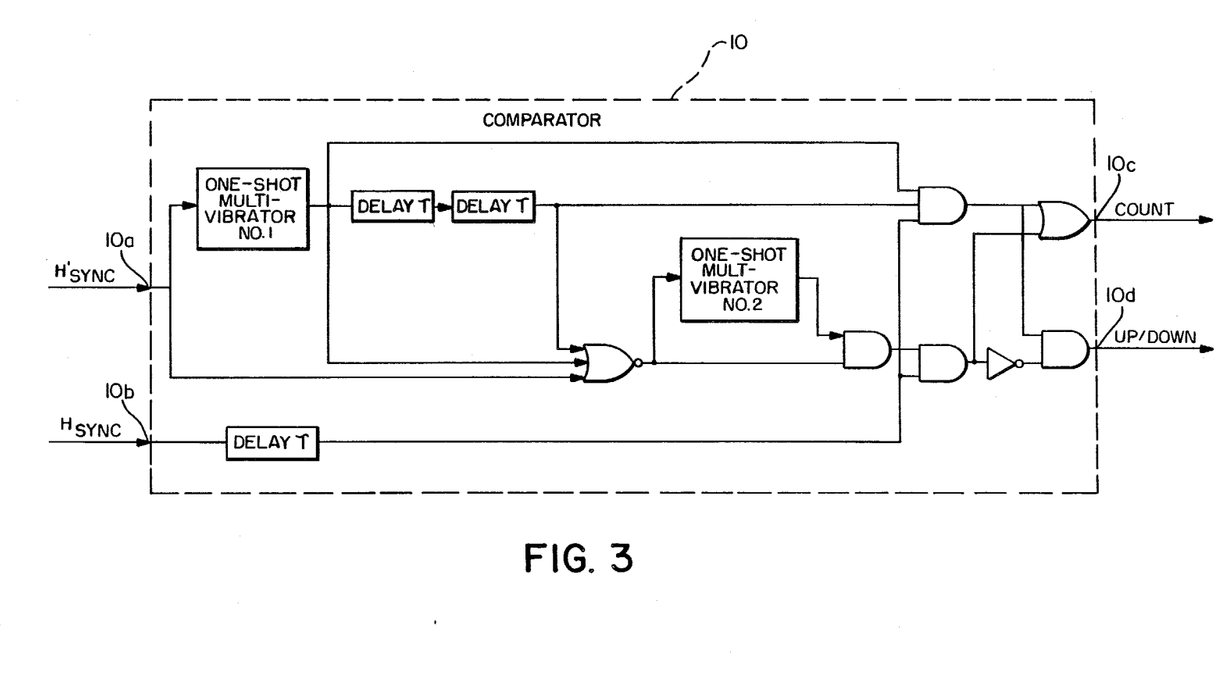
FIG. 3 is a simplified logic diagram of the sync comparator of FIG. 2.

The system of FIG. 2b may be employed with great advantage to perform time base error correction during TDM recording of an incoming composite video signal produced by, for example, another video tape player. The incoming video signal to be recorded may contain large time base errors (due, for example, to the defective condition or inferior quality of the other video tape player), which errors ought to be removed prior to recording. In this invention, time base error correction is performed during the multiplexing process prior to recording.

Figure 6:
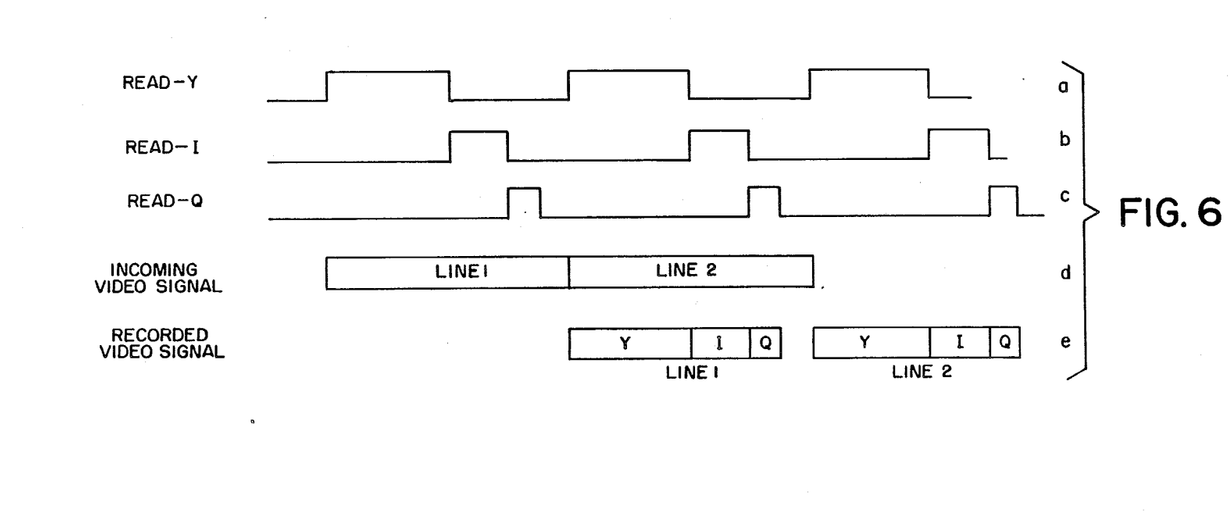
FIG. 6 includes contemporaneous timing diagrams illustrating the operation of the system of FIG. 2 in record mode.

Referring to FIG. 2b, an incoming composite video signal which is to be recorded is separated by a filter 80 into its constituent Y, I and Q components. The Y, I and Q components (FIG. 6d) are then fed through the Y, I and Q analog-to-digital converters 28, 30 and 32 to the Y, I and Q memories 2a, 2b, 2c, respectively. A WRITE ENABLE signal initiates simultaneous writing of the Y, I and Q video signals into the memories 2a, 2b, 2c at the frequencies $f_1$, $f_2$, $f_3$, respectively. The WRITE ENABLE signal is synchronized by the write timing logic with the incoming $H_{sync}$ pulse.

Reading out from each of the Y, I and Q memories 2a, 2b, 2c is performed sequentially at the data frequency $f_4$, respectively. The three video signals sequentially read-out of the three memories 2a, 2b, 2c are combined serially in the circuit 46 prior to recording to form the multiplexed video signal of FIG. 6e.

Three signals, READ-Y, READ-I, READ-Q (FIGS. 6a, 6b, 6c) applied to the memory read control inputs 2a', 2b', 2c' (instead of the READ ENABLE signals) control the sequence of reading from the memories 2a, 2b, 2c, respectively. These three signals are produced in synchronism with the VCO 52 whose output is fed to the divide counter 50. The N-bit output of the divide counter 50 is fed to a timing logic circuit 60 which generates the READ-Y, READ-I, READ-Q signals.

The comparator 10 receives the incoming $H_{sync}$ pulse and the reference $H'_{sync}$ pulse. The comparator 10 controls the up/down counter 54 in the manner discussed previously in reference to playback operation. In the event of a time base error indicated by a late or early incoming $H_{sync}$ pulse, the comparator 10 causes the up/down counter 54 to count up or down, respectively. This shifts the timing of the READ-Y, READ-I and READ-Q signals with respect to the timing of the incoming $H_{sync}$ pulse in order to compensate for the time base error.

In summary, the invention frequency-locks the multiplexing or demultiplexing of a video signal to its horizontal line frequency and simultaneously time-shifts the signal to perform time base error correction using just the TDM memory, without requiring any additional memory space, and while avoiding conflicting uses of the memory, a remarkable achievement.

The invention has been described in detail with particular reference to preferred embodiments thereof, but it will be understood that variations and modifications can be effected within the spirit and scope of the invention.

What is claimed is:

1. In a video tape player adapted to reproduce a composite video signal from a previously recorded time division multiplexed video signal characterized by a video line frequency, wherein plural time division video segments of said multiplexed video signal are sequentially written during a write time interval into a memory so as to occupy just a limited memory space therein, and wherein said plural video segments are simultaneously read out of said memory during a read time interval characterized by a read interval repetition frequency, a system for correcting time base errors corresponding to variations in the time between arrival of successive pluralities of said video segments, said system comprising:

means for frequency-locking said read interval repetition frequency to said video line frequency;

means for sensing said time base errors;

means for time-shifting said read interval with respect to said write interval in response to said sensing means so as to compensate said time base errors, and for restricting the time-shift of said read interval to a memory idle time window proportional to the duration of said write time interval, whereby said time-shifting and the reading and writing of said plural video segments occur just within said limited memory space, wherein said sensing means compares said multiplexed video signal with a stable time reference in order to sense said time base errors, whereby said time-shifting means shifts said read interval with respect to said write interval whenever necessary to maintain the time of commencement of said read interval at least nearly invariant with respect to said stable time reference, wherein said successive video segment pluralities correspond to successive horizontal video lines of said multiplexed video signal;

said frequency-locking means comprise means for starting said memory read interval after a predetermined delay following the beginning of each one of said horizontal video lines;

said time-shifting means changes said predetermined delay in response to said sensing means, whereby said read interval remains frequency-locked with said horizontal lines even while it is shifted in time with respect thereto, wherein said read interval starting means comprise:

means for counting through a count cycle up to a maximum count R by a modulus M and a count period T derived from said stable time reference, and for starting said read interval upon the occurrence of said maximum count; and means for initiating said counting cycle of said counting means in synchronism with said video signal synchronization frequency, whereby the starting of said read interval is frequency-locked to said video line frequency;

wherein said time-shifting means comprise:

means for changing said modulus M in response to said sensing means by no more than said maximum count R, wherein (T)(R) corresponds to the duration D of said memory idle time window, so as to permit a maximum time-shift of said read interval at least nearly equal to the duration of said memory idle time window.

2. The video tape player of claim 1 further comprising means for inhibiting said sensing means whenever said time base errors exceed an amount proportional to the duration of said memory idle time window.

3. In a video tape player adapted to reproduce a de-multiplexed video signal from a previously recorded time division multiplexed video signal, said player including a memory, said memory characterized by a write time interval for sequentially loading into said memory a plurality of serial time divided video segments of said multiplexed video signal, and characterized by a read time interval for simultaneously unloading from said memory said plurality of video segments, a time base error correction system, comprising:

means for sensing variations in the time base of said multiplexed video signal;

means responsive to said sensing means for time-shifting said memory read interval with respect to said memory write interval so as to counteract said time base variations whenever said sensing means senses said time base variations;

means for restricting said time-shifting means from shifting said read interval beyond an idle time window of said memory, the duration D of said idle time window being proportional to the length of said write time interval;

means for synchronizing said sensing means with a reference time base;

means for frequency-locking said read interval to said multiplexed video signal, said frequency-locking means comprising a divide counter characterized by a count modulus, a maximum count R and a count period T derived from said reference time base, said counter being initiated in synchronism with said multiplexed video signal, wherein:

said time-shifting means comprise means for changing the modulus of said counter by no more than R, wherein (R)(T)=D.

4. The video tape player of claim 3 wherein said sensing means includes means for inhibiting said sensing means whenever said time base variations exceed an amount proportional to said idle time window duration D.

* * * * *